US010554947B1

(12) United States Patent
Li

(10) Patent No.: US 10,554,947 B1
(45) Date of Patent: Feb. 4, 2020

(54) METHOD AND APPARATUS FOR STEREO VISION MATCHING INCLUDING DISPARITY REFINEMENT BASED ON MATCHING MERIT VALUES

(71) Applicant: Marvell International Ltd., Hamilton (BM)

(72) Inventor: Huai Dong Li, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 312 days.

(21) Appl. No.: 15/375,661

(22) Filed: Dec. 12, 2016

Related U.S. Application Data

(60) Provisional application No. 62/268,072, filed on Dec. 16, 2015.

(51) Int. Cl.
| | | |
|---|---|---|
| *H04N 13/00* | (2018.01) | |
| *H04N 13/128* | (2018.01) | |
| *G06K 9/62* | (2006.01) | |
| *H04N 13/15* | (2018.01) | |

(52) U.S. Cl.
CPC ......... *H04N 13/128* (2018.05); *G06K 9/6202* (2013.01); *H04N 13/15* (2018.05)

(58) Field of Classification Search
CPC ..... H04N 13/128; H04N 13/15; G06K 9/6202
USPC .......................................................... 348/46
See application file for complete search history.

(56) References Cited

U.S. PATENT DOCUMENTS

| | | | | |
|---|---|---|---|---|
| 2013/0335527 | A1* | 12/2013 | Takahashi | H04N 19/597 348/43 |
| 2014/0254918 | A1* | 9/2014 | Cheng | G06K 9/00201 382/154 |
| 2015/0221098 | A1* | 8/2015 | Uemori | G06T 7/254 382/154 |
| 2015/0228057 | A1* | 8/2015 | Ishigami | G06T 5/001 382/274 |
| 2015/0269738 | A1* | 9/2015 | Saitoh | G01S 17/026 382/154 |

(Continued)

OTHER PUBLICATIONS

Heiko Hirschmuller; "Accurate and Efficient Stereo Processing by Semi-Global Matching and Mutual Information"; IEEE Computer Society Conference on Computer Vision and Pattern Recognition, (CVPR); vol. 2; Jun. 20-26, 2005; pp. 807-814.

(Continued)

*Primary Examiner* — Zhihan Zhou

(57) ABSTRACT

A system is provided and includes a memory and a control module. The memory stores first and second pixel data corresponding to first and second image frames. The control module performs stereo vision matching including: accessing the first and second pixel data; determining initial disparity values that indicate differences between positions of the first and second pixel data; determining matching merit values for the first pixel data, where each of the matching merit values is indicative of a reliability level of a corresponding one of the initial disparity values; determining weights based on (i) the initial disparity values, (ii) differences between intensity values of the first and second pixel data, and (iii) the matching merit values; and refining the initial disparity values, based on the weights, to provide refined disparity values. The control module estimates a depth of a feature or an object based on the refined disparity values.

22 Claims, 8 Drawing Sheets

(56) References Cited

U.S. PATENT DOCUMENTS

2016/0173852 A1* 6/2016 Moon .................. G06T 7/593
                                                348/43
2016/0198138 A1* 7/2016 Wu .................... H04N 5/247
                                                348/47

OTHER PUBLICATIONS

Heiko Hirschmuller et al.; "Evaluation of Cost Functions for Stereo Matching"; 2007 IEEE Conference on Computer Vision and Pattern Recognition; Jun. 17-22, 2007; 8 pages.
Computer Stereo Vision; Wikipedia, the free encyclopedia; https://en.wikipedia.org/wiki/Computer_stereo_vision; printed on Apr. 22, 2016; 7 pages.

* cited by examiner

METHOD AND APPARATUS FOR STEREO VISION MATCHING INCLUDING DISPARITY REFINEMENT BASED ON MATCHING MERIT VALUES

CROSS-REFERENCE TO RELATED APPLICATIONS

This application claims the benefit of U.S. Provisional Application No. 62/268,072, filed on Dec. 16, 2015. The entire disclosure of the application referenced above is incorporated herein by reference.

FIELD

The present disclosure relates to stereo vision matching systems, and more particularly to disparity refinement.

BACKGROUND

Stereo vision matching is used to determine disparity values between image frames received from multiple image sensors (e.g., cameras). Disparity estimation is a process of identifying differences between corresponding points between stereo image frames or more image frames), which are captured from the image sensors. Disparity estimation is used in virtual reality systems, object tracking and recognition systems, and depth-image based rendering systems to determine depths of objects in image frames.

Disparity estimation can be performed between rectified stereo images, meaning the corresponding points of the rectified stereo images reside along a same row (or in a same line in a Y-direction). FIG. 1 shows stereo images (a left image frame 100 and a right image frame 102) received from two image sensors. A point 104 of an object 106 shown in the left image 100 is at a different position than the same point 104 of the object 106 as shown in the right image frame 102. The point 104 is shifted to the left and in an X-direction from a position X to a position X-d. A dashed line view 108 of the object 106 is shown in the right image frame 102 at a position of the object 106 as shown in the left image frame 100 to illustrate the differences in the positioning of the object between the left image frame 100 and the right image frame 102. The shift d in terms of pixel position is the disparity between the position of the point 104 in the right image frame 102 relative to the position of the same point 104 in the left image frame 100.

Disparity estimation processing can be challenging due to sizes of the local support regions, radiometric variations, texture-less regions depth discontinuity regions, etc. Designing a stereo vision matching system with good balance between accuracy and efficiency remains a challenging problem. Current disparity estimation algorithms can be classified into local algorithms and global algorithms. Local algorithms compute disparity values for each pixel within a selected local region of an image frame. Global algorithms compute disparity values for each pixel of a whole image frame.

The local algorithms perform well for well-textured simple image frames, but not as well for natural (or complex) image frames. A well-textured image frame refers to an image frame that has a large amount of luminance change across a local region of the image frame. An image frame or local region of an image frame is defined as being complex if the image frame and/or local region has a homogeneous region for which it is difficult to determine disparity values. Natural image frames are complex due to (i) different sensor response curves provided by image sensors for the environment captured, and (ii) different exposure times of the image sensors. The sensor response curves are based on location, movement and/or exposure control of the image sensors. Global algorithms perform better than local algorithms for stereo vision matching of complex images. Global algorithms treat stereo vision matching as an energy minimization problem and obtain global disparity allocation via optimization methods such as dynamic programming (DP), graph cuts (GC), and belief propagation (BP).

Implementation of local algorithms is computationally less expensive than implementation of global algorithms due to the use of less memory and lower processing requirements. Recent advances in adaptive selection of local regions of image frames have improved results of using a local algorithm for a complex image frame while requiring less memory and lower processing requirements than a global algorithm. Adaptive selection can include selection of size and location of a region within an image frame. The adaptive selection of local regions allows regions that are less homogeneous and/or not homogeneous to be selected to aid in determining disparity values.

SUMMARY

A system is provided and includes one or more memories and a control module. The one or more memories stores (i) first pixel data corresponding to a first image frame, and (ii) second pixel data corresponding to a second image frame. The control module performs stereo vision matching including: accessing the first pixel data and the second pixel data; determining initial disparity values, where the initial disparity values indicate differences between positions of (i) the first pixel data and (ii) the second pixel data; determining matching merit values for the first pixel data, where each of the matching merit values is indicative of a reliability level of a corresponding one of the initial disparity values; determining weights based on (i) the initial disparity values (ii) differences between intensity values of (a) the first pixel data and (b) the second pixel data, and (iii) the matching merit values; and refining the initial disparity values, based on the weights, to provide refined disparity values. The control module estimates a depth of a feature or an object based on the refined disparity values.

In other features, a method is provided and includes performing stereo vision matching. The stereo vision matching includes: accessing first pixel data stored in a first memory, where the first pixel data corresponds to a first image frame; accessing second pixel data stored in the first memory or a second memory, where the second pixel data corresponds to a second image frame; determining initial disparity values, where the initial disparity values indicate differences between positions of (i) the first pixel data and (ii) the second pixel data; determining matching merit values for the first pixel data, where each of the matching merit values is indicative of a reliability level of a corresponding one of the initial disparity values; determining weights based on (i) the initial disparity values, (ii) differences between intensity values of (a) the first pixel data and (b) the second pixel data, and (iii) the matching merit values; and refining the initial disparity values, based on the plurality of weights, to provide refined disparity values. The method further includes estimating a depth of a feature or an object based on the refined disparity values.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Local and global algorithms, when determining disparity values, perform one or more of the following: A) a matching cost algorithm; B) a cost aggregation algorithm; C) a disparity optimization algorithm; and/or D) a disparity refinement algorithm (referred to as "algorithms A-D. The sequence of steps performed depends on which of the stated algorithms A-D are performed and the order in which the algorithms are performed. Typically, not all of algorithms A-D are performed. Some local algorithms perform algorithms A and B and a matching cost algorithm, where the matching cost algorithm is based on a support region (e.g., a normalized cross-correlation between the same region or similar regions of two image frames from two image sensors or a rank transform). Examples of a rank transform are a Fourier transform, a discrete cosine transform and a length transform. The rank transform of the region provides a ranked value for that region. On the other hand, global algorithms make explicit smoothness assumptions solve an optimization problem, and typically perform algorithms A and C and do not perform algorithm B. During execution of a global algorithm, algorithm C is performed to minimize a global cost function that combines data and smoothness terms.

The examples disclosed below include local algorithms for performing stereo vision matching. The local algorithms include performing: a matching cost algorithm; a cost aggregation algorithm; a disparity optimization algorithm; and a disparity refinement algorithm. The disparity refinement algorithm includes refining disparity values based on determined matching merit values and a joint histogram. The refined disparity values provide an improved disparity image based on which depth estimate can be determined. The improved disparity image allows for more accurate depth estimation of objects within image frames, which allows for improved performance of virtual reality systems, object tracking and recognition systems, and depth-image based rendering systems.

Figure 1:
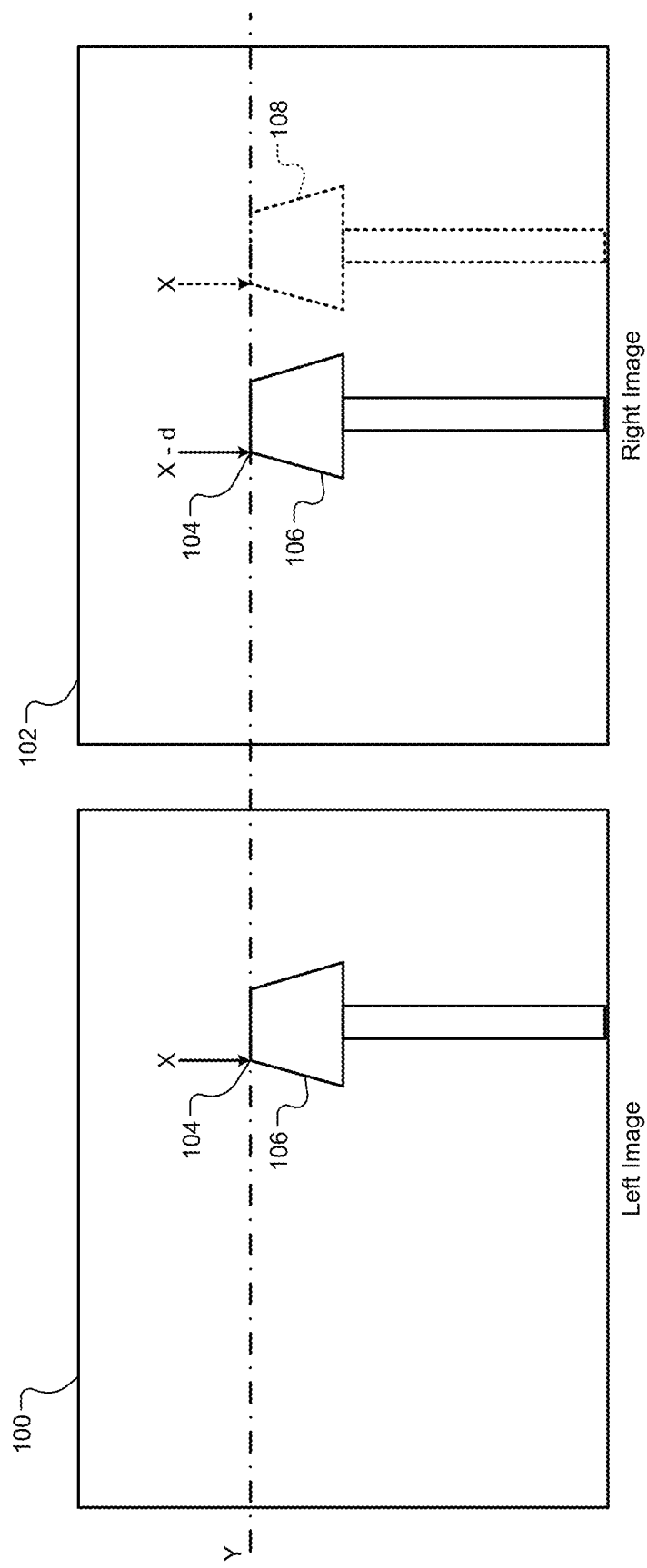
FIG. 1 is a view of two image frames illustrating determination of a disparity value for a point of an object.
Figure 2:
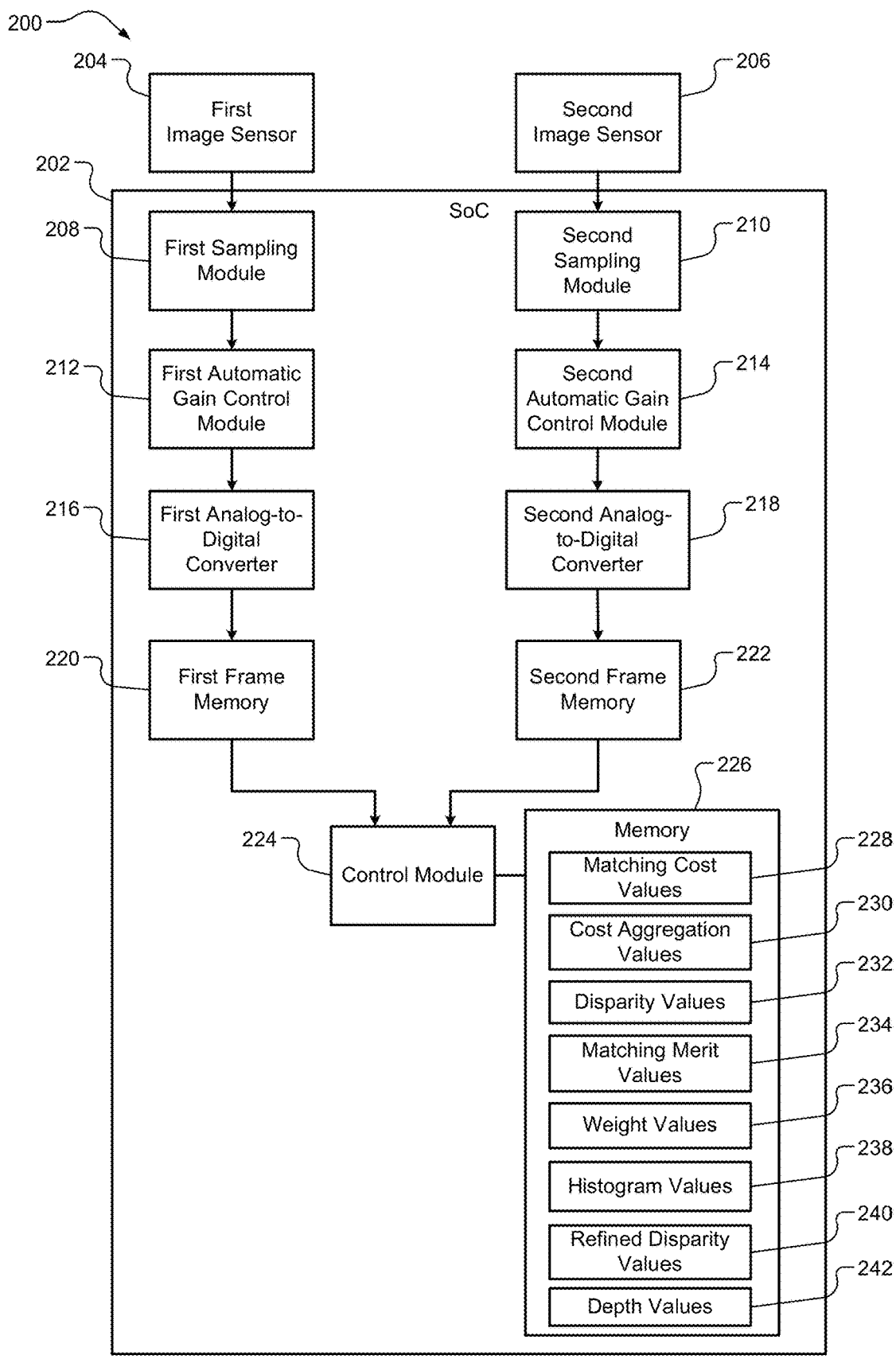
FIG. 2 is a functional block diagram of an example of a stereo vision matching system in accordance with an embodiment of the present disclosure.

FIG. 2 shows a stereo vision matching system 200 that includes two or more image sensors and a system-on-chip (SoC) 202. As an example, a left (or first) image sensor 204 and a right (or second) image sensor 206 are shown. Although two image sensors and corresponding hardware are shown, additional image sensors and hardware may be included. In one embodiment, the image sensors 204, 206 are cameras capable of capturing image frames of an environment. As an example, the image sensors 204, 206 may be located on an automotive vehicle and used to detect oncoming objects.

The SoC 202 includes, but is not limited to, sampling modules 208, 210, automatic gain control (AGC) modules 212, 214, analog-to-digital (A/D) converters 216, 218, frame memories 220, 222, a control module 224 and a memory 226. The sampling modules 208, 210 sample and/or filter output signals received respectively from the image sensors 204, 206 to provide conditioned signals. The AGC modules 212, 214 may include and/or be implemented as AGC amplifiers and adjust gain of the conditioned signals provided by the sampling modules 208, 210 to provide amplified signals. The A/D converters 216, 218 convert the amplified signals from analog signals to digital signals. The digital signals include image frames captured by the image sensors 204, 206. The image frames included in the digital signals are stored in the frame memories 220, 222. In one embodiment, the frame memories 220, 222 are implemented as first-in-first-out memories.

The control module 224 receives and compares the image frames stored in the frame memories 220, 222. The image frames are stored as pixel data, where each data point indicates and/or has a corresponding intensity level, color, and/or location (e.g., X, Y coordinates) for a pixel of an image frame. Although the control module 224 is shown as receiving and comparing images from two frame memories, if additional image sensors are included, the control module 224 may receive and compare image frames from more than two frame memories. The control module 224 performs stereo vision matching based on the received image frames to estimate depths of features and/or objects in the image frames. Features may be elements and/or points on objects and/or portions of a region of the image frames having varying luminance (or pixel intensity). The stereo vision matching includes disparity refinement including matching merit operations and histogram generation for improved disparity estimation.

The control module 224, during stereo vision matching, generates matching cost values 228, cost aggregation values 230, disparity values 232, matching merit values 234, weight values 236, histogram values 238, refined disparity values 240 and depth values 242. These values are stored in the memory 226 and are further described below with respect to FIG. 3 and the methods of FIG. 4.

Figure 3:
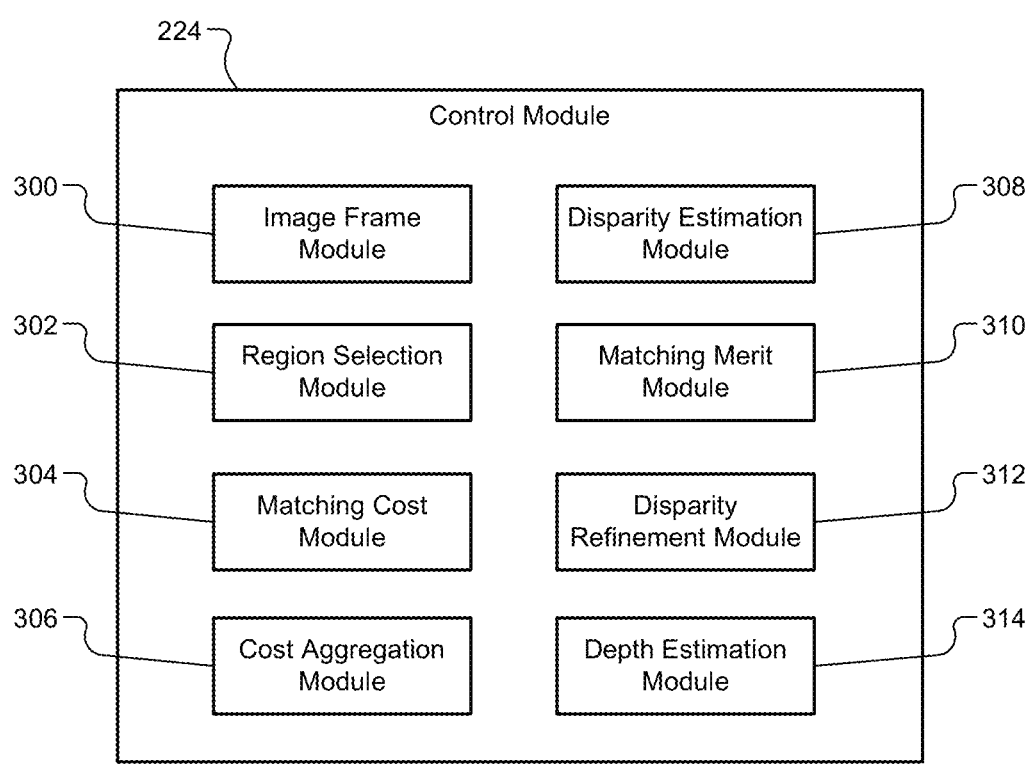
FIG. 3 is a functional block diagram of an example of a control module of the stereo vision matching system of FIG. 2.

FIG. 3 shows the control module 224, which includes, according to one embodiment, an image frame module 300, a region selection module 302, a matching cost module 304, a cost aggregation module 306, a disparity estimation module 308 a matching meat module 310 a disparity refinement module 312, and a depth estimation module 314. The modules 300, 302, 304, 306, 308, 310, 312 are described below with respect to the method of FIG. 4.

For further defined structure of the modules of FIGS. 2-3 see below provided method of FIG. 4 and below provided definition for the term "module".

Figure 4:
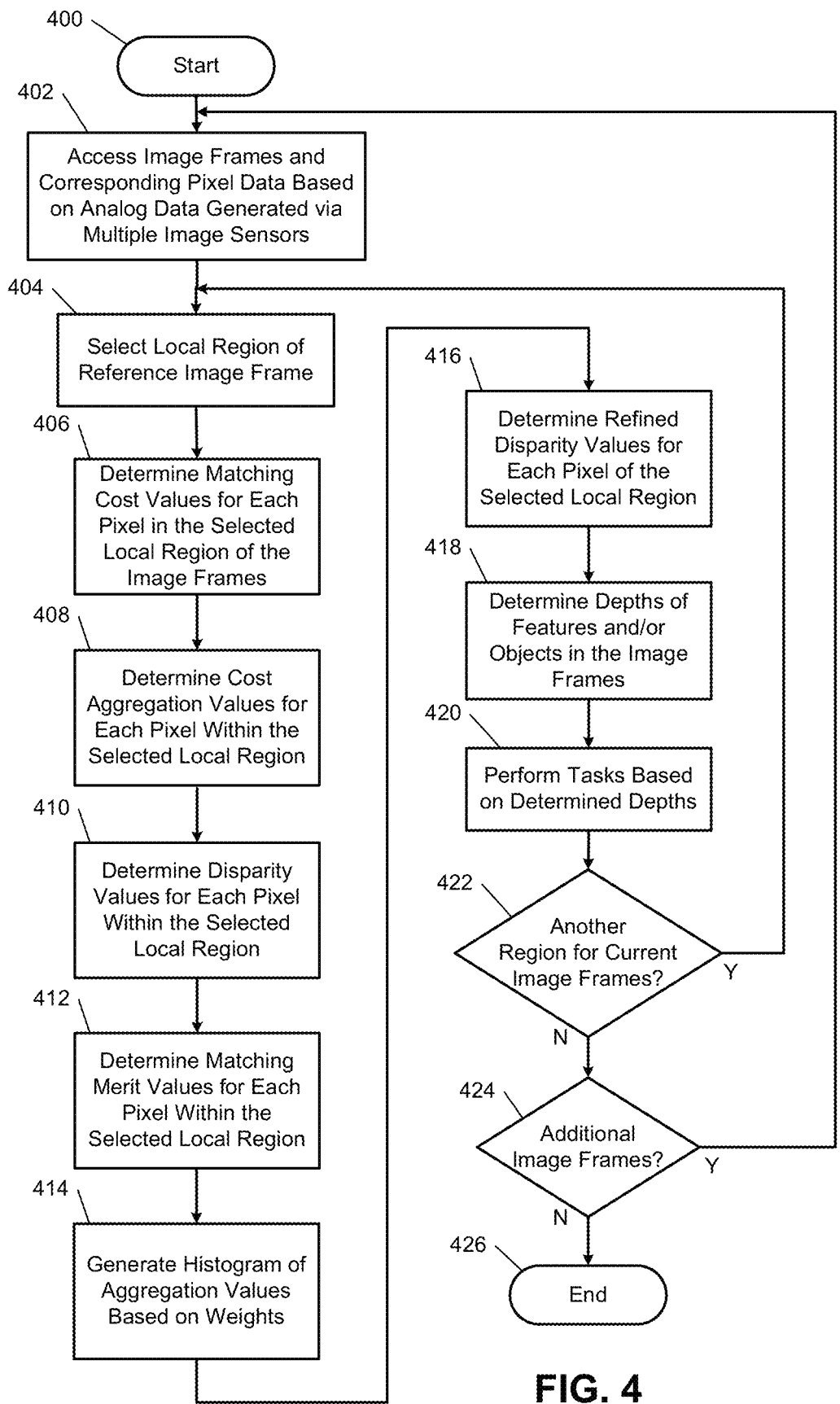
FIG. 4 illustrates an example stereo vision matching method including a disparity refinement method in accordance with an embodiment of the present disclosure.

The systems disclosed herein may be operated using numerous methods, example method is illustrated in FIG. 4. In FIG. 4, an example stereo vision matching method including a disparity refinement method is shown. Although the following tasks are primarily described with respect to the implementations of FIGS. 2-3, the tasks may be easily modified to apply to other implementations of the present disclosure. The tasks may be iteratively performed.

The method may begin at 400. At 402, the image frame module 300 may access the frame memories 220, 222 and/or a memory storing image frames and corresponding pixel data.

At 404, the region selection module 302 selects a region of one of the image frames for disparity determination. This may include selecting the size, shape and location of the region. As an example, a region may refer to a set of pixels in a left image frame or in a right image frame depending on which of the image frames is a reference image frame. The region may refer to a set of pixels in the reference image frame, based on which the following disparity estimations are performed. Region selection may be based on luminance variations across an image frame. For example, a region having a luminance variation (or pixel intensity variation) greater than a predetermined amount may be selected.

At 406, the matching cost module 304 determines matching cost values $C_{MC}(x,y,d)$ for each pixel located at $(x_i,y_i)$ in the region of the left image frame and each corresponding pixel located at $(x_i-d,y_i)$ in the right image frame, where $x_i$ is a position along a x-axis, d is a disparity value, $y_i$ is a position along a y-axis, and i is the number of pixels in the selected region. Each of the matching cost values $C_{MC}(x,y,d)$ may be determined using equation 1, where $C_{int}(x,y,d)$ is a pixel intensity difference, $C_{grad}(x,y,d)$ is a matching cost gradient difference, $C_{census}(x,y,d)$ is a transform difference and α and β are predetermined weights (e.g., predetermined constants).

$$C_{MC}(x,y,d)=(1-\alpha-\beta)\cdot C_{MC}(x,y,d)+\alpha\cdot C_{grad}(x,y,d)+\beta\cdot C_{census}(x,y,d) \quad (1)$$

$C_{int}(x,y,d)$ may be calculated using equation 2 for a single channel image or equation 3 for a red, green, and blue (RGB) color (3 channel) image frame, where I is pixel intensity. For a RGB color image frame, a luminance value may be used for a single channel calculation.

$$C_{int}(x,y,d) = |I^{left}(x,y) - I^{right}(x-d,y)| \quad (2)$$

$$C_{int}(x,y,d) = \frac{\left|\sum_{ch=R,G,B} I_{ch}^{left}(x,y) - I_{ch}^{right}(x-d,y)\right|}{3} \quad (3)$$

$C_{grad}(x,y,d)$ may be calculated using equations 4-6, where ∇ refers to a partial difference of a value in an x-direction.

$$C_{grad}(x,y,d)=|\nabla I^{left}(x,y)-\nabla I^{right}(x-d,y)| \quad (4)$$

$$\nabla I^{left}(x,y)=|I^{left}(x+1,y)-I^{left}(x-1,y)| \quad (5)$$

$$\nabla I^{right}(x-d,y)=|I^{right}(x-d+1,y)-I^{right}(x-d-1,y)| \quad (6)$$

$C_{census}(x,y,d)$ may be calculated using a census transform. In one embodiment, $C_{census}(x,y,d)$ values for $x_i$, $y_i$ are binary values (e.g., 0 or 1) and are set based on comparisons between (i) pixel intensity values of pixels surrounding a center pixel of the selected region and (ii) a pixel intensity value of the center pixel. As an example, if the pixel intensity values of the pixels surrounding the center pixel are greater than the pixel intensity value of the center pixel, then $C_{census}(x,y,d)$ is 1, otherwise $C_{census}(x,y,d)$ is 0 for that center pixel.

At 408, the cost aggregation module 306 determines one or more cost aggregation values E(x,y,d) for each of the pixels in the selected region. In one embodiment, each cost aggregation value is determined based on (e.g., summing or averaging) the matching cost values determined at 406 for pixels located in a window RE centered at a pixel of the candidate image frame corresponding to the cost aggregation value determined. The window RE may be moved to determine multiple cost aggregation values for each of the pixels in the selected region of the reference image frame. The window RE may be the same size and shape as the selected region or may be a different size and/or shape. The window RE may be a fixed size and shape for each of the pixels in the selected region or may be adapted (changed in size and/or shape) for each of the pixels in the selected region. In one embodiment, the window RE is a fixed size and shape and is moved to be centered at each pixel location (x, y). The size and shape of the window(s) may be based on luminance variation across the image frame and/or across the selected region and/or within a predetermined area around the selected region. The size and shape of the window RE may be adapted based on pixel intensity similarity around each center pixel location. The pixel intensity similarity refers to differences in pixel intensity values for pixels within a predetermined range of the center pixel for which an aggregation value is being determined. Each of the cost aggregation values may be determined using equation 7.

$$E(x,y,d)=\Sigma_{(x,y)\in RE}C_{MC}(x,y,d) \quad (7)$$

At 410, the disparity estimation module 308 determines initial disparity values $d_i$ for each of the pixels in the selected region. The disparity values $d_i$ effectively identify the points (or pixels) in the candidate image frame that correspond respectively to points (or pixels) in the reference frame. The initial disparity values $d_i$ are determined based on the cost aggregation values determined at 408. Each of the initial disparity values $d_i$ may be based on one or more of the cost aggregation values determined at 408.

In one embodiment, a winner-takes-all (WTA) method is used to determine a disparity value for each pixel in the selected region. This includes finding a point (or pixel) in the candidate frame that minimizes a corresponding matching cost of a pixel in the reference frame. The initial disparity values for each point may be determined using equation 8, where $d_{min},d_{max}$ are preselected values.

$$d_i=\arg\min_d E(x,y,d), \text{ for } d\in[d_{min},d_{max}] \quad (8)$$

At 412, the matching merit module 310 determines matching merit values $MER_i$ for each of the pixels within the selected region based on the cost aggregation values determined at 408. A matching merit value is defined and stored for each pixel of the selected region. In one embodiment and for each matching merit value, two or more minimum cost aggregation values are selected. In another embodiment and for each matching merit value, a first minimum cost aggregation value $E_1(x,y,d)$, a second minimum cost aggregation value $E_2(x,y,d)$ and a third minimum cost aggregation value $E_3(x,y,d)$ corresponding to a location $(x,y)$ are selected for $d \in [d_{min}, d_{max}]$. The first minimum cost aggregation value is the smallest cost aggregation value for a pixel of the selected region. The second minimum cost aggregation value is the second smallest cost aggregation value and is greater than the first minimum cost aggregation value. The third minimum cost aggregation value is the third smallest cost aggregation value and is greater than the second minimum cost aggregation value.

A ratio is determined based on the selected minimum cost aggregation values for each of the matching merit values $MER_i$. If matching merit estimation is limited to one pixel precision, differences between two of the minimum cost aggregation values may be negligible. For this reason and continuing from the above-provided example, the first minimum cost aggregation value and the third minimum cost aggregation value may be used and the second minimum cost aggregation value may not be used. A ratio of $E_1(x,y,d)$ to $E_3(x,y,d)$ (or $E_3(x,y,d)$ to $E_1(x,y,d)$) is determined. The matching merit values $MER_i$ may be determined using expression 9, where $k_1, k_2, \ldots, k_{n-1}$, are coefficients (or predetermined constants), n is a predetermined constant, and N is a maximum possible matching merit value. The higher the value of MER, the more reliable the corresponding disparity value. The higher the value of MER, the higher the reliability level of the corresponding initial disparity value.

$$MER_i = \begin{cases} N & \text{if } \frac{E_3}{E_1} \geq k_{n-1} \\ N-1 & \text{if } k_{n-1} > \frac{E_3}{E_1} \geq k_{n-2} \\ \ldots & \ldots \\ 2 & \text{if } k_2 > \frac{E_3}{E_1} \geq k_1 \\ 1 & \text{if } \frac{E_3}{E_1} < k_1 \end{cases} \quad (9)$$

Figure 5B:
FIG. 5B is an example of a matching merit image frame provided based on matching merit values in accordance with an embodiment of the present disclosure.
Figure 5A:
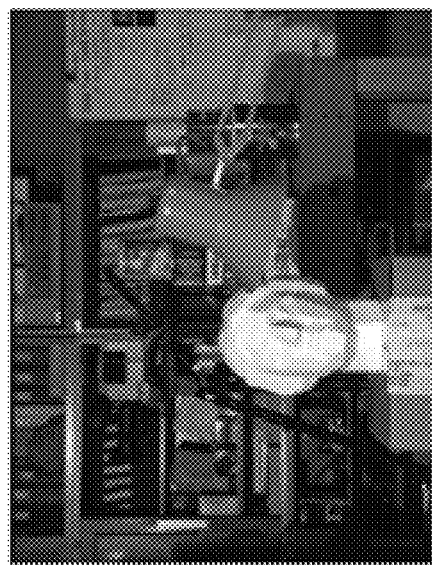
FIG. 5A is an example of an image frame captured via an image sensor.

FIGS. 5A, 5B show examples of a captured image frames (e.g., the left image frame of a pair of captured image frames) and a corresponding matching merit image frame. As can be seen, dark areas of the captured image frame are texture-less areas or repeatable texture areas where matching merit values are less reliable. A shortcoming of the WTA method is the resultant output tends to be noisy as shown in FIG. 5B.

At 414, the disparity refinement module 312 generates a histogram for each of the pixels in the selected region to determine a refined disparity value $d_{final}$. The matching merit values $MER_i$ are integrated (i.e. used to provide a histogram) for the voting of a refined disparity value, which results in better disparity estimation. This allows information associated with pixels surrounding a center pixel to be used in providing improved disparity values.

Assume a selected window WIN is centered at a pixel location $(x_0,y_0)$, a histogram is generated including histogram aggregation values His with a bin number set to between $[d_{min}, d_{max}]$. A weighted contribution WC to the histogram of each pixel $(x_i, y_i)$ within the window WIN at bin number (or initial disparity value) $d_i(x_i,y_i)$ is calculated. The weighted contribution may be calculated using equation 10 and the histogram aggregation values His may be calculated using equation 11, where weight values $W_S$, $W_{int}$, $W_d$, $W_{MER}$ are calculated using equations 12-16.

$$WC = W_S \cdot W_{int} \cdot W_d \cdot W_{MER} \quad (10)$$

$$His(d) = \Sigma_{(x_i,y_i) \in WIN} W_S \cdot W_{int} \cdot W_d \cdot W_{MER} \quad (10)$$

Figure 6:
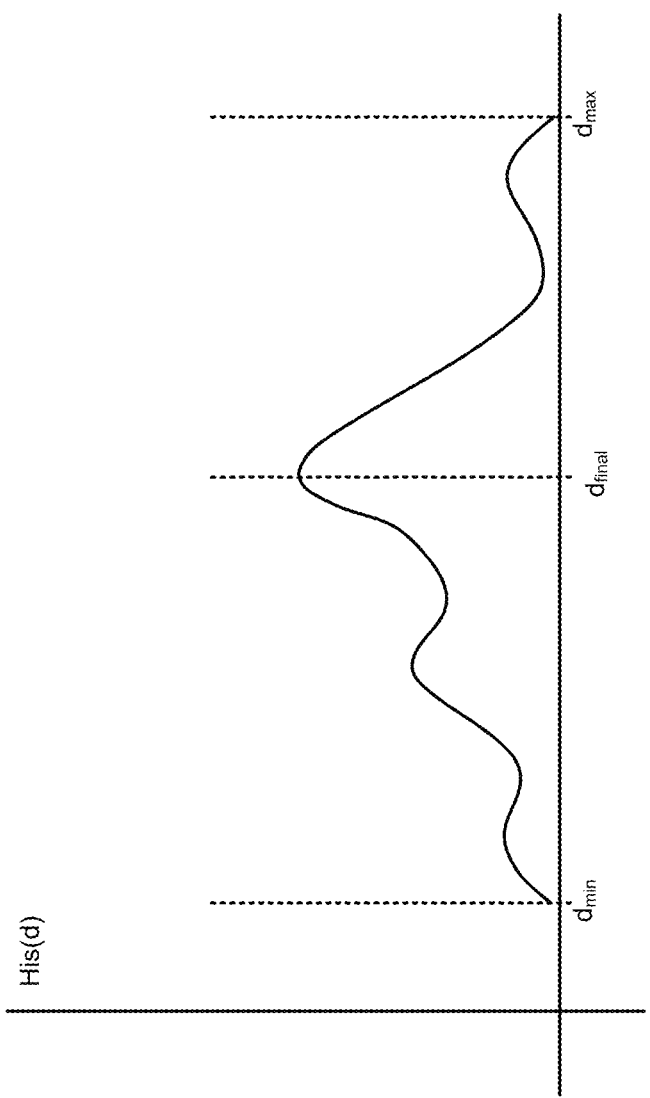
FIG. 6 is an example of a histogram generated during the disparity refinement method of FIG. 4.

FIG. 6 shows an example of a histogram for window WIN centered at pixel $(x_0,y_0)$. The histogram is a plot of aggregation values His versus bin numbers (or disparity values) within the range $[d_{min}, d_{max}]$.

The weight $W_S$ is calculated based on the distance between pixel $(x_i, y_i)$ and pixel $(x_o, y_o)$, as shown by equation 12, where exp is an exponential function and $\sigma_s$ is a predetermined tuning parameter (or predetermined constant).

$$W_s = \exp\left(-\frac{((x_i - x_0)^2 + (y_i - y_0)^2)}{\sigma_S^2}\right) \quad (12)$$

The weight $W_{int}$ is calculated based on a difference in intensity levels of pixel $(x_i, y_i)$ and pixel $(x_o, y_o)$ as shown by equations 13 and 14, where $\sigma_{int}$ is a predetermined tuning parameter (or predetermined constant). Equation 13 may be used for single channel image frame. Equation 14 may be used for a RGB color image frame.

$$W_{int} = \exp\left(-\frac{(I_{ch}(x_i, y_i) - I_{ch}(x_0, y_0))^2}{\sigma_{int}^2}\right) \quad (13)$$

$$W_{int} = \exp\left(\sum_{ch=R,G,B} \frac{(I_{ch}(x_i, y_i) - I_{ch}(x_0, y_0))^2}{3\sigma_{int}^2}\right) \quad (14)$$

The weight $W_d$ is calculated based on a difference in initial disparity values for pixel $(x_i, y_i)$ and pixel $(x_o, y_o)$ as shown by equation 15, where $\sigma_d$ is a predetermined tuning parameter (or predetermined constant).

$$W_d = \exp\left(-\frac{(d_i(x_i, y_i) - d_i(x_0, y_0))^2}{\sigma_d^2}\right) \quad (15)$$

The weight is calculated based on the determined matching merit value for pixel $(x_i, y_i)$, where $k_{MER}$ is a predetermined tuning parameter (or predetermined constant).

$$W_{MER} = \frac{MER(x_i, y_i)}{k_{MER}} \quad (16)$$

At 416, the disparity refinement module 312 selects the disparity values of the histograms with the highest corresponding aggregation values. For example, the highest aggregation value of the histogram His of FIG. 6 has a corresponding disparity value $d_{final}$. The disparity value having the largest aggregation value is determined to be the refined disparity value for the corresponding pixel in the selected region and thus replaces the corresponding initial disparity value. The highest aggregation value may be determined using equation 17.

$$d_{final} = arg\ max(His[d]),\ \text{for}\ d \in [d_{min}, d_{max}] \qquad (17)$$

Figure 7B:
FIG. 7B is an example of a true disparity image frame.
Figure 7D:
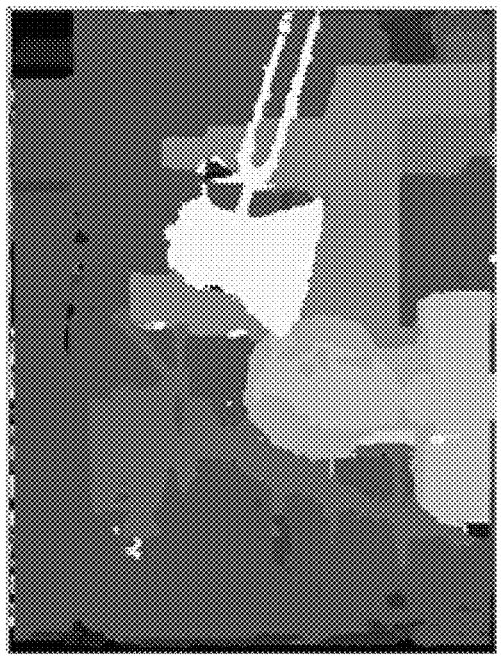
FIG. 7D is an example of a disparity estimation image frame generated based on the disparity refinement method of FIG. 4.
Figure 7A:
FIG. 7A is the image frame of FIG. 5A.
Figure 7C:
FIG. 7C is an example of a disparity estimation image frame generated based on a disparity determination method.
Figure 8A:
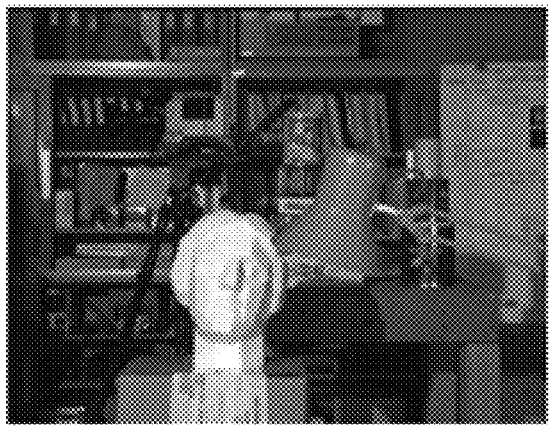
FIG. 8A is the image frame of FIG. 5A.
Figure 8B:
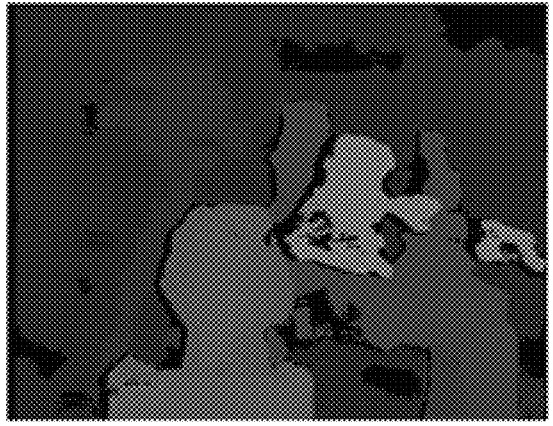
FIG. 8B is an example of a disparity estimation image frame generated using a multiple window multiple filter (MWMF) algorithm.
Figure 8C:
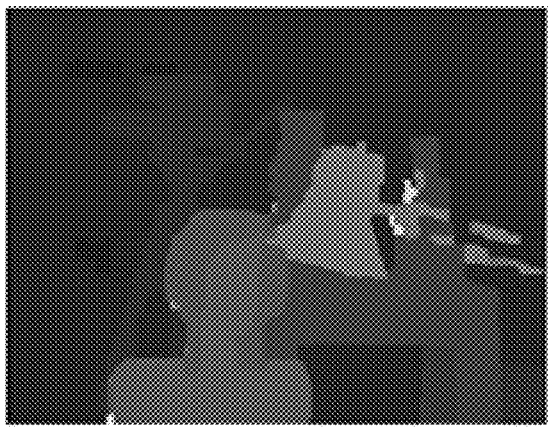
FIG. 8C is an example of a disparity estimation image frame generated using a belief propagation (BP) algorithm.
Figure 8D:
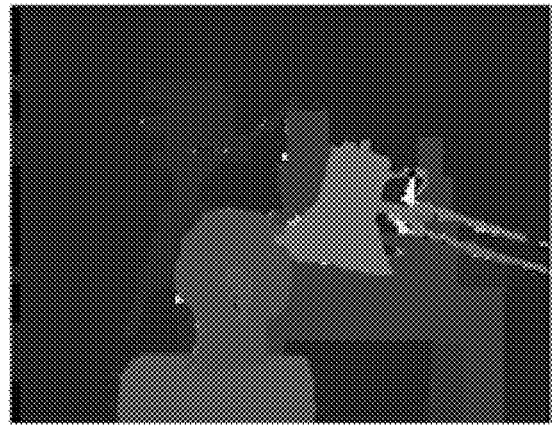
FIG. 8D is an example of a disparity estimation image frame generated using a graph cuts (GC) algorithm.
Figure 8E:
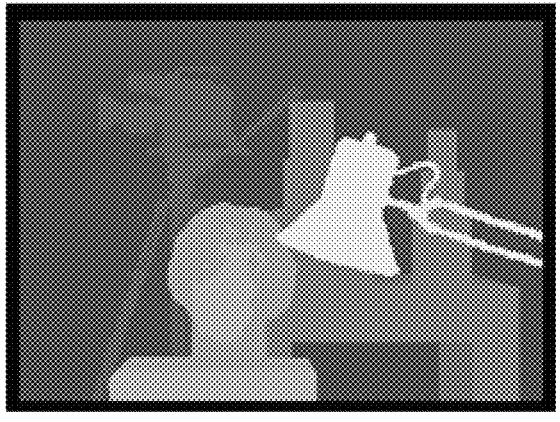
FIG. 8E is the true disparity image frame of FIG. 6B.
Figure 8F:
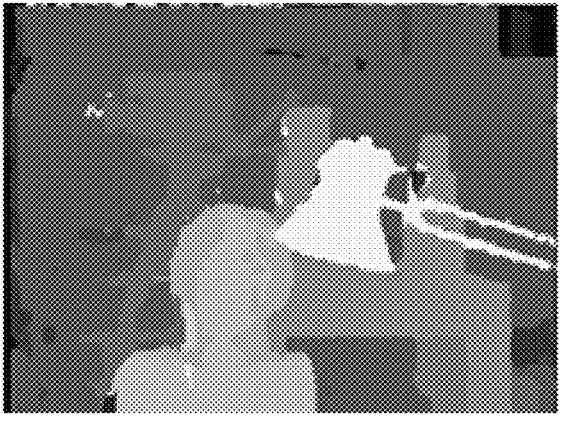
FIG. 8F is the disparity estimation image frame of FIG. 6D.

FIGS. 7A-7D show, for a same pair of captured image frames, one of the captured image frames; a true disparity image frame; an example of a disparity estimation image frame generated based on a disparity determination method; and an example of a disparity estimation image frame generated based on the disparity refinement method of FIG. 4. As can be seen, the disparity estimation image frame generated using the disparity refinement method of FIG. 4 is less noisy and clearer than the disparity estimation image frame of FIG. 7C. The disparity estimation image frame of FIG. 7C, as an example, is generated using the above-described WTA method to provide the initial disparity values. The disparity estimation image frame of FIG. 7C is generated using the above-described WTA method and then the above-described disparity refinement method.

Referring again to FIG. 4, at 418, the depth estimation module 314 may estimate depths of features (e.g., points or sets of points) and/or objects in the captured images based on the refined disparity values determined at 416. As known in the art, depths of objects in an image can be determined based on disparity values. Various known depth estimation techniques are known in the art and are therefore not described herein.

At 420, the control module 224, based on the determined depths, may perform various tasks. In one embodiment the control module 224 based on the determined depths of the features and/or objects, performs image recognition (or object recognition), object tracking and/or other object related tasks. Image recognition and object tracking based on determined feature depths and/or object depths are known in the art and are therefore not described herein.

At 422, the control module 224 determines whether stereo vision matching for another region of the current image frames is to be performed. If stereo vision matching is to be performed for another region, task 404 is performed, otherwise task 424 is performed. At 424, the control module 224 determines whether stereo vision matching is to be performed for additional image frames. If yes, task 402 is performed, otherwise the method may end at 426.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

FIGS. 8A-8F show for a same pair of captured image frames: the previously shown captured image frame; an example of a disparity estimation image frame generated using a multiple window multiple lifter (MWMF) algorithm; an example of a disparity estimation image frame generated using a belief propagation (BP) algorithm; an example of a disparity estimation image frame generated using a graph cuts (GC) algorithm; the previously shown true disparity image frame; and the disparity estimation image frame generated using the disclosed disparity refinement method. The disparity refinement method provides a clearer image frame with more luminance variation than the disparity estimation image frame generated using the MWMF algorithm, which is a local method. The disparity refinement method also provides better results than that provided using the BP global algorithm and provides comparable results to that provided using the GC global algorithm. The BP algorithm and the GC algorithm however require more computations than the disclosed methods because the BP algorithm and the GC algorithm are global methods, whereas the disclosed methods are local methods.

The disclosed methods include local stereo vision matching algorithms, which may be implemented using only a couple of line buffers for storage of matching merit values and does significantly increase a number of computations performed over a traditional local algorithm, which does not include the disclosed disparity refinement. Performance provided using the disclosed methods is comparable to the state of arts global matching algorithm such as graph cuts (GC) and belief propagation (BP). Although a single refinement method is disclosed above, additional refinement can be applied to further improve overall performance. The disclosed refinement method can be applied to any local method to improve overall performance. It can also be applied to other fields such as motion filtering.

The foregoing description is merely illustrative in nature and is in no way intended to limit the disclosure, its application, or uses. The broad teachings of the disclosure can be implemented in a variety of forms. Therefore while this disclosure includes particular examples, the true scope of the disclosure should not be so limited since other modifications will become apparent upon a study of the drawings the specification, and the following claims. It should be understood that one or more steps within a method may be executed in different order (or concurrently) without altering the principles of the present disclosure. Further although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
   one or more memories to store (i) first pixel data corresponding to a first image frame, and (ii) second pixel data corresponding to a second image frame; and
   a control module to
      perform stereo vision matching comprising
         accessing the first pixel data and the second pixel data,
         determining initial disparity values, wherein the initial disparity values indicate differences between positions of (i) the first pixel data and (ii) the second pixel data,
         determining a plurality of matching merit values for the first pixel data, wherein each of the plurality of matching merit values is indicative of a reliability level of a corresponding one of the initial disparity values, wherein the reliability level is indicative of at least one of a dependability level or a consistency level of the initial disparity values,
         determining a plurality of weights based on (i) the initial disparity values, (ii) differences between intensity values of (a) the first pixel data and (b) the second pixel data, and (iii) the plurality of matching merit values, and
         refining the initial disparity values, based on the plurality of weights, to provide refined disparity values, and
      estimate a depth of a feature or an object based on the refined disparity values.

2. The system of claim 1, wherein the control module is to:
   select a region of the first image frame;
   determine matching cost values for pixels in the region of the first image frame, wherein the matching cost values are based on differences between (i) intensity values of the pixels in the region of the first image frame and (ii) intensity values of pixels in a corresponding area of the second image frame; and
   determine cost aggregation values based on the matching cost values, wherein the cost aggregation values are based on the matching cost values for pixels in a predetermined window of the first image frame,
wherein the matching merit values are generated based on the cost aggregation values.

3. The system of claim 2, wherein the control module is to determine the matching cost values based on:
intensity differences between (i) the pixels in the region of the first image frame and (ii) pixels in the second image frame; and
pixel gradient differences between (i) the pixels in the region of the first image frame and (ii) the pixels in the second image frame.

4. The system of claim 2, wherein the control module is to:
determine the initial disparity values respectively for pixels in the region of the first image frame,
while determining the initial disparity values for each pixel in the region of the first image frame, determine which of a predetermined set of disparity values provide minimum corresponding matching cost values; and
select the initial disparity values to be the disparity values that provided the minimum corresponding matching cost values.

5. The system of claim 1, wherein the control module is to:
determine cost aggregation values based on the matching cost values, wherein the cost aggregation values are a sum or average of the matching cost values for pixels in a predetermined window of the first image frame; and
determine each of the plurality of matching merit values based on a ratio between two of the cost aggregation values.

6. The system of claim 5, wherein the control module is to:
determine, for a pixel of the first image frame, a first minimum cost aggregation value, a second minimum cost aggregation value, and a third minimum cost aggregation value; and
determine one of the plurality of matching merit values based on a ratio between the first minimum cost aggregation value and the third minimum cost aggregation value.

7. The system of claim 1, wherein the control module is to:
based on the plurality of weights and for a range of disparity values, generate a first histogram for first pixels of the first image frame, wherein the first histogram is a plot of first aggregation values versus disparity values in the range of disparity values;
determine the first aggregation values based on the plurality of weights;
select a first disparity value of the first histogram having a maximum corresponding aggregation value as a refined disparity value; and
replace one of the initial disparity values with the refined disparity value.

8. The system of claim 7, wherein the control module is to determine one of the plurality of weights based on the plurality of matching merit values.

9. The system of claim 7, wherein the control module is to:
determine a product of the plurality of weights for each of the first pixels,
wherein the first pixels are in a predetermined window of the first image frame; and
each of the aggregation values is a sum of the products of the plurality of weights for the first pixels in the predetermined window of the first image frame.

10. The system of claim 9, wherein:
the predetermined window is centered at a first pixel; and
the control module is to
select the first disparity value for the first pixel,
center the predetermined window at a second pixel of the first image frame,
based on a second plurality of weights, generate a second histogram for second pixels of the first image frame, wherein the second histogram is a plot of second aggregation values versus disparity values,
determine the aggregation values based on the second plurality of weights,
select a second disparity value of the second histogram having a maximum corresponding aggregation value as a second refined disparity value, and
replace one of the initial disparity values with the second refined disparity value.

11. The system of claim 5, wherein:
each of the plurality of matching merit values is determined based on a plurality of ratios and comparisons between the plurality of ratios and a plurality of predetermined values;
the plurality of ratios includes the ratio between the two of the cost aggregation values; and
each of the plurality of ratios is between a corresponding two of the cost aggregation values.

12. A method comprising:
performing stereo vision matching comprising
accessing first pixel data stored in a first memory, wherein the first pixel data corresponds to a first image frame,
accessing second pixel data stored in the first memory or a second memory, wherein the second pixel data corresponds to a second image frame,
determining initial disparity values, wherein the initial disparity values indicate differences between positions of (i) the first pixel data and (ii) the second pixel data,
determining a plurality of matching merit values for the first pixel data, wherein each of the plurality of matching merit values is indicative of a reliability level of a corresponding one of the initial disparity values, wherein the reliability level is indicative of at least one of a dependability level or a consistency level of the initial disparity values,
determining a plurality of weights based on (i) the initial disparity values, (ii) differences between intensity values of (a) the first pixel data and (b) the second pixel data, and (iii) the plurality of matching merit values, and
refining the initial disparity values, based on the plurality of weights, to provide refined disparity values; and
estimating a depth of a feature or an object based on the refined disparity values.

13. The method of claim 12, further comprising:
selecting a region of the first image frame;
determining matching cost values for pixels in the region of the first image frame, wherein the matching cost values are based on differences between (i) intensity values of the pixels in the region of the first image frame and (ii) intensity values of pixels in a corresponding area of the second image frame; and determining cost aggregation values based on the matching cost values, wherein the cost aggregation values are based on the matching cost values for pixels in a predetermined window of the first image frame, wherein the matching merit values are generated based on the cost aggregation values.

14. The method of claim 13, further comprising determining the matching cost values based on:

intensity differences between (i) the pixels in the region of the first image frame and (ii) pixels in the second image frame; and pixel gradient differences between (i) the pixels in the region of the first image frame and (ii) the pixels in the second image frame.

15. The method of claim 13, further comprising:

determining the initial disparity values respectively for pixels in the region of the first image frame;

while determining the initial disparity values for each pixel in the region of the first image frame, determining which of a predetermined set of disparity values provide minimum corresponding matching cost values; and selecting the initial disparity values to be the disparity values that provided the minimum corresponding matching cost values.

16. The method of claim 12, further comprising:

determining cost aggregation values based on the matching cost values, wherein the cost aggregation values are a sum or average of the matching cost values for pixels in a predetermined window of the first image frame; and determining each of the plurality of matching merit values based on a ratio between two of the cost aggregation values.

17. The method of claim 16, further comprising:

determining, for a pixel of the first image frame, a first minimum cost aggregation value, a second minimum cost aggregation value, and a third minimum cost aggregation value; and determining one of the plurality of matching merit values based on a ratio between the first minimum cost aggregation value and the third minimum cost aggregation value.

18. The method of claim 12, further comprising:

based on the plurality of weights and for a range of disparity values, generating a first histogram for first pixels of the first image frame, wherein the first histogram is a plot of first aggregation values versus disparity values in the range of disparity values, and wherein the first aggregation values are determined based on the plurality of weights;

selecting a first disparity value of the first histogram having a maximum corresponding aggregation value as a refined disparity value; and replacing one of the initial disparity values with the refined disparity value.

19. The method of claim 18, further comprising determining one of the plurality of weights based on the plurality of matching merit values.

20. The method of claim 18, further comprising determining a product of the plurality of weights for each of the first pixels, wherein:

the first pixels are in a predetermined window of the first image frame; and each of the aggregation values is a sum of the products of the plurality of weights for the first pixels in the predetermined window of the first image frame.

21. The method of claim 20, further comprising:

selecting the first disparity value for the first pixel, wherein the predetermined window is centered at a first pixel;

centering the predetermined window at a second pixel of the first image frame;

based on a second plurality of weights, generating a second histogram for second pixels of the first image frame, wherein the second histogram is a plot of second aggregation values versus disparity values;

determining the aggregation values based on the second plurality of weights;

selecting a second disparity value of the second histogram having a maximum corresponding aggregation value as a second refined disparity value; and replacing one of the initial disparity values with the second refined disparity value.

22. The system of claim 11, wherein:

each of the plurality of ratios is compared to one or more of the plurality of predetermined values; and one or more of the plurality of ratios is compared to two of the plurality of predetermined values.

* * * * *